Aug. 7, 1928.  
J. P. LAVIGNE  
WHEEL  
Filed Oct. 28, 1926  
1,680,265
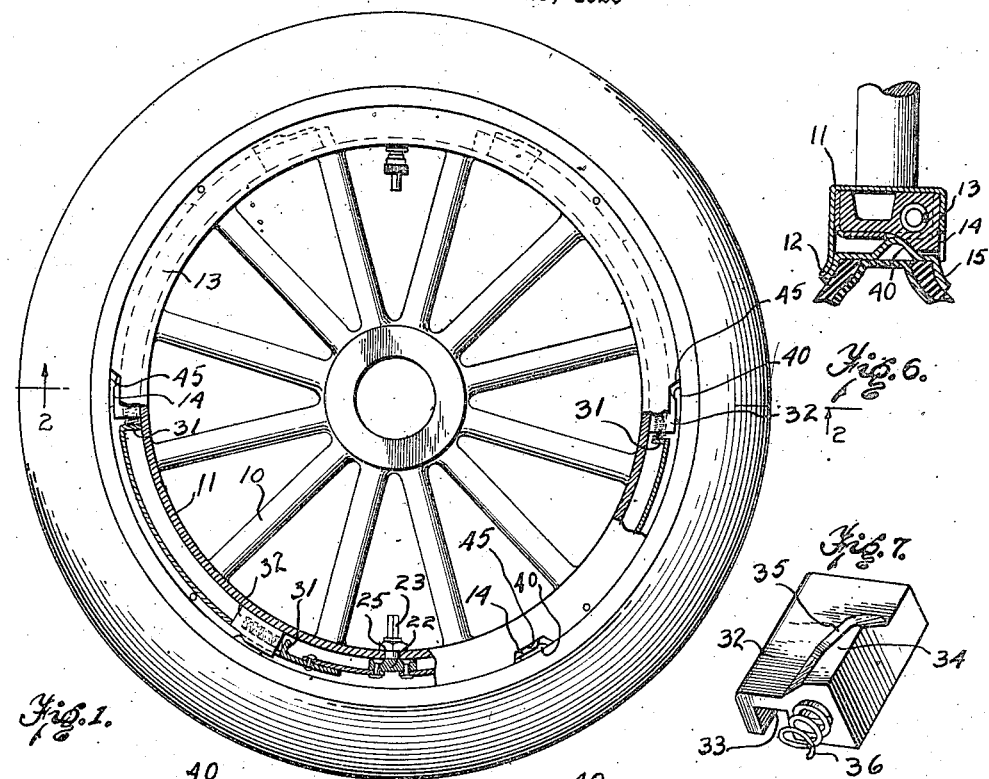
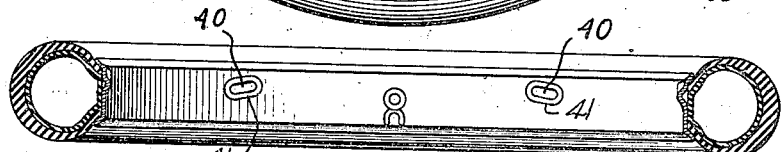
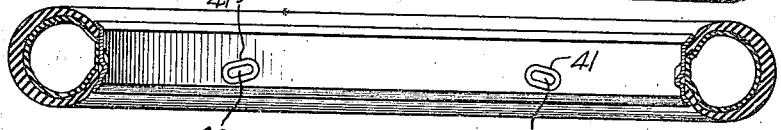
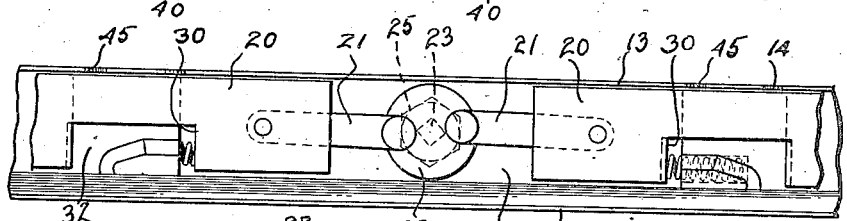
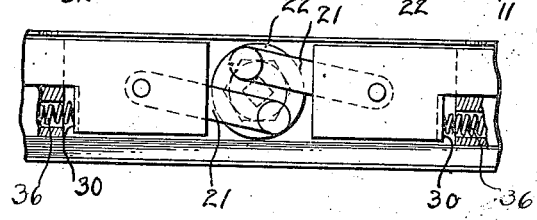
INVENTOR.  
Joseph P. Lavigne  
by  
Francis D. Hardesty  
ATTORNEY.

Patented Aug. 7, 1928.

1,680,265

UNITED STATES PATENT OFFICE.

JOSEPH P. LAVIGNE, OF DETROIT, MICHIGAN, ASSIGNOR TO GRIFFITH, LAVIGNE & HAMEL COMPANY, OF DETROIT, MICHIGAN, A CORPORATION OF MICHIGAN.

WHEEL.

Application filed October 28, 1926. Serial No. 144,714.

The present invention relates to wheels for automotive vehicles and to demountable rims therefor.

Among the objects of the invention is to facilitate the mounting and demounting of such rims from the wheel.

Another object is to enable the securing of such rims in place on the felly or the detachment thereof through the operation of a single element instead of having to tighten or loosen six or more lugs as is necessary in the usual construction.

With these and other objects in view as will readily appear to those skilled in the art the invention consists in a wheel embodying a plurality of movable cam pieces adapted to be moved by a single operating device and to co-operate with fixed cams on the rim to hold the latter securely in place or to release the latter according to the direction of movement of the operating device.

Reference should be made to the accompanying drawings in which:

Fig. 1, is an elevation of a wheel and rim with parts in section.

Fig. 2, is a section through the rim on line 2—2 of Fig. 1.

Figure 3 is a sectional view of the rim on line 2—2 looking in the other direction.

Fig. 4, is a view of a portion of the felly showing the operating device in fastening position.

Fig. 5, is a view similar to Fig. 4, showing the operating device in unfastened position.

Fig. 6, is a section through the felly and rim on line 6—6 of Fig. 1.

Fig. 7 is a perspective of one of the movable cam blocks.

In the drawings, 10 indicates a wheel which is conventional as far as the spokes and central portion are concerned. It is however provided with a preferably metal channeled felly 11 extending sufficiently high on one side as indicated at 12, to form a stop or abutment against which one side of the demountable rim 15 rests when in position on the wheel. The other side 13 of the channel 11 is narrower and slightly smaller in diameter than the inner diameter of rim 15, permitting the latter to be taken off or put on over its edge. This lower side 13 of the channel is also notched as at 14 at a plurality of points for a purpose to be explained later.

Lying within the channel of felly 11 are two arc-shaped racks 20 which are preferably formed of sheet metal channels opening inwardly. The arcs of racks 20 will be of about 150 degrees each so that when connected at one end in the manner to be described there will be a space between the other ends of about 50 or 60 degrees. The racks 20 have at one end of each a link 21 by means of which they are connected to a disc 22 which has within the felly 11 and has secured thereto centrally a stud 23 which extends radially of the wheel through the felly. This stud is threaded for a portion of its length and is provided with a squared end 24 so that a suitable wrench may be applied thereto and the stud and disc thereby rotated. The threaded portion of stud 23 provides for a suitable lock nut 25.

In the form of construction shown each rack 20 is provided with three slots 30 in one side thereof and a portion of the metal at the end nearest disc 22 instead of being cut away is bent down to form an abutment 31 (see Fig. 1). In these slots are seated blocks 32 which are of the form shown in Fig. 7. These blocks are substantially rectangular and grooved underneath as at 33 in order to lessen the lower bearing surface, while the upper surface is provided with an upwardly extending cam portion 34. This cam portion occupies one corner of the rectangular top of the block and its forward portion 35 is inclined both to the block surface and the median line thereof. At the rear end of the block is a seat for a compression spring 36, as shown clearly in Fig. 7, and this spring coacts with the abutment 31, as above mentioned, to force forward the block in its slot 30. It will be understood, of course, that the racks 20 each with its blocks 32 will be constructed "rights" and "lefts" so that their movements will oppose each other.

The form of wheel just described is designed to cooperate with a rim such as is shown in Figs. 1, 2, 3, and 6. In these figures the rim is shown as being provided with internally projecting bumps or lugs 40 of which there are preferably six or more to correspond with the six or more blocks 32. These lugs 40 will be spaced as are the blocks 32 and located to one side of the median line of the rim. Lugs 40 will also be somewhat elongated and inclined with respect to said median line so that the sides 41 thereof will coact with the faces 35 of cams 34 to force the rim against the high side of the felly when the disc 22 is operated to push apart the racks 20.

In order to permit the passage of lugs 40 into the channels of the felly, notches 45 may be cut, suitably spaced, in the narrow side thereof and, as indicated, when six lugs 40 are being used, only four notches are necessary, and these only when the narrow side of the felly channel is extended up to about the inside surface of the rim. The latter is desirable to prevent, as far as possible, entrance of mud etc., into the channel.

The operation of the device is simple. In order to remove the rim, the disc 22 is operated to bring together the racks 20 thereby releasing lugs 40 so that the rim can be lifted off. In order to secure the rim in place, it is first placed on the felly and the disc 22 operated to separate the racks. This causes the cams 34 to coact with lugs 40 to force the rim tightly against the high side 12 of the felly channel. The blocks 32 being forced forward by springs 36 are thereby enabled to compensate for manufacturing errors in the spacing of the lugs 40 or slots 30.

Having now described the invention and the preferred form of embodiment thereof it is to be understood that the said invention is not to be limited to the specific details herein described and illustrated but only by the scope of the claims which follow.

Claims:—

1. A vehicle wheel having a channeled felly with one wall of said channel higher than the other, a pair of oppositely disposed racks in said channel connected at one end of each to means whereby said racks may be moved longitudinally, slots in said racks, cam blocks in said slots, and spring means between said blocks and the ends of said slots toward said moving means, said cam blocks adapted to coact with suitable lugs upon a tire rim to hold the latter in place upon the felly against the high side of said channel.

2. In a device of the character described a channeled felly, a rack adapted to slide therein, said rack having a slot provided with an abutment at one end, a rim supporting cam block in said slot and a compression spring co-operating with said abutment to tend to force said block toward the opposite end of said slot.

JOSEPH P. LAVIGNE.